Oct. 9, 1962     A. F. CHAPMAN ETAL     3,057,505
FILM-COVERED SHAPED OBJECTS
Filed Oct. 18, 1957
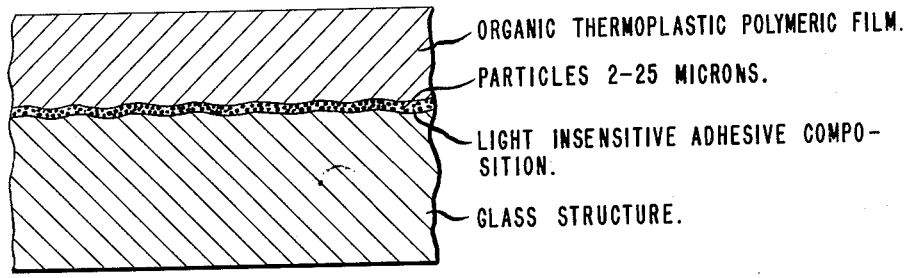
INVENTORS
AURELIUS FRANKLIN CHAPMAN
RICHARD ARTHUR SUTHERLAND
BY *Herbert M Wolfson*
ATTORNEY

3,057,505
FILM-COVERED SHAPED OBJECTS
Aurelius Franklin Chapman and Richard Arthur Sutherland, Wilmington, Del., assignors to E. I. du Pont de Nemours and Company, Wilmington, Del., a corporation of Delaware
Filed Oct. 18, 1957, Ser. No. 690,962
6 Claims. (Cl. 220—2.1)

This invention relates to the use of organic thermoplastic polymeric films as coverings for substantially transparent, shaped objects of glass. More particularly, it relates to the use of polyethylene terephthalate film as a protective shield over the cathode ray vacuum tubes used as television tubes.

The need for a shatterproof, skintight covering or partial covering (shield) for breakable, substantially transparent, shaped objects such as flash bulbs, incandescent lamp bulbs, glass bottles, vitreous lamp shades, fluorescent light tubes, television picture tubes, etc. which are not readily detectable or noticeable, and which do not impair the functions of the object covered, is well known. Because of a combination of properties such as strength, toughness, clarity, ability to adapt easily to the contour of the underlying shaped object and the resistance to the deleterious action of chemical agents, organic thermoplastic polymeric films have been suggested as candidates to fulfill this need. The suggested process for applying such films to the shaped glass objects involves draping the film over the shaped object, the film or the glass object having been provided with an adhesive coating over the entire area to be bonded or at selected points or portions of the shaped object to be covered by the film.

However, in applications where it is important to view through the underlying glass object such as in television picture tubes, the heretofore known processes have not been completely successful. Due to the uneven wetting action of any adhesive employed, air pockets and/or light interference patterns form between the glass and the film. These pockets and/or patterns provide light distortions and, in general, detract from the appearance of the underlying glass object.

It is an object of the present invention to provide a shaped, substantially transparent object of glass with a covering of an organic thermoplastic polymeric film substantially free from light distortion. It is a further object to provide a substantially shatterproof television picture tube with a closely adherent shield of polyethylene terephthalate film, the combination being free of light interference patterns. Other objects will appear hereinafter.

The objects are accomplished by a shaped, substantially transparent glass structure having a covering of an organic substantially transparent, thermoplastic polymeric film bonded to the glass structure at selected areas of adherence, preferably around the perimeter of the glass structure, in which inert particles having a particle size of 2–25 microns are dispersed uniformly over the surface common to the glass structure and the polymeric film covering to prevent direct contact of the glass structure and the polymeric film covering except at the aforementioned areas of adherence.

The drawing is an enlarged cross-section of one embodiment of the invention in which the organic thermoplastic polymeric film is affixed to the glass structure through a light insensitive adhesive composition containing the inert particles of 2–25 microns in size dispersed uniformly throughout the composition.

The process involves coating either the glass structure or the organic thermoplastic polymeric film, preferably the film, with a light insensitive composition containing inert particles having a particle size of 2–25 microns, the concentration of particles in the light insensitive composition being preferably 2–5%, and affixing the coated side of the film to the underlying glass structure.

Because of its ideally high impact resistance, tensile strength, elongation and tear strength, particular emphasis will be placed on the use of polyethylene terephthalate film as the film covering in the present invention. However, it should be understood that other organic thermoplastic polymeric films such as polyvinyl fluoride, cellulose acetate, etc. may also be employed. The process of this invention may be carried out with substantially amorphous, unoriented polyethylene terephthalate film or with oriented, non-heat-set polyethylene terephthalate film (such film being shrinkable at elevated temperatures). The invention is particularly useful when using as the covering polyethylene terephthalate film which has been elongated in both directions to form a film having substantially the same physical properties in both directions and which has been heat-set (maintained at an elevated temperature while applying tension to restrict dimensional change) at an elevated temperature of at least 150° C. Preferably, such polyethylene terephthalate film is oriented by elongating the film to an extent of at least 200% by stretching or rolling the film in both directions or by a combination of stretching in one direction and rolling in the other direction.

The preferred embodiment of the present invention is a combination involving the cathode ray tube for television sets, television picture tubes and the like, enveloped by an organic thermoplastic polymeric film, preferably the oriented, heat-set polyethylene terephthalate film, being separated from the film covering by the use of inert particles selected from the group consisting of sand, starch, diatomaceous earth and titanium dioxide, the largest dimension of the particles being 2–25 microns.

The invention will be more clearly understood by referring to the examples of preferred embodiments compared to a control and the discussion which follows.

EXAMPLES I–III

Samples of polyethylene terephthalate film having a thickness of 0.0075", which had been oriented by stretching to the extent of 200% in both directions and heat-set under tension at a temperature of about 200° C., were coated with an adhesive composition containing 14% by weight of an ethylene terephthalate-ethylene sebacate (60–40) copolymer dissolved in 1,1,2-trichloroethane. The composition also contained 3%, based on the weight of the copolymer, of cornstarch particles having a particle size of about 25 microns. The coating was applied by means of a 50 lines/inch knurled roll run at coating speeds of about 30 feet/minute. The coated samples were dried in a conventional drier at 105–110° C. The coating thickness on the film samples averaged from 0.2 to 0.3 mil. Since the film samples were to be bonded to television picture tubes in a subsequent operation, the portions of the samples which were to contact the perimeter of the picture tube were coated with the adhesive composition containing no particles.

For Example II, 3% sand having a particle size of approximately 10 microns was substituted for the cornstarch particles of Example I to provide coated film samples having coating thicknesses ranging from 0.2 to 0.3 mil. In all other respects, the details were identical to those provided in Example I.

For Example III, 3% "Celite" (a diatomaceous earth manufactured by Johns-Manville Corporation) having a particle size of 2–4 microns was substituted for the cornstarch particles of Example I to provide coated film samples having coating thicknesses ranging from 0.2 to 0.3 mil. In all other respects, the details were identical to those provided in Example I.

As a control, the inert particles were omitted from the coating composition. In all other respects, the details were identical to those disclosed in Example I. Film samples having coating thicknesses between 0.2 and 0.3 mil were formed.

The four coated film samples were then each drape-formed around a television picture tube in the following manner: The coated film was clamped tightly on all four sides in a metal frame and heated to a temperature of 200° C. by holding the assembly over a series of electric heaters. The heated film was then held over the picture tube. The tube mounted in a cradle was moved upwardly while a vacuum was drawn upon the atmosphere enclosed by the film thus sucking the film downwardly over the tube.

The television picture tubes covered with the samples of polyethylene terephthalate film produced according to procedures described for Examples I–III had an excellent appearance and were completely free of light distortion. However, in the control, where the film samples were coated over the complete contacting surface with the adhesive composition and no particles were used, the film adhered unevenly to the glass tube. Air pockets and light interference rings were noticeable and, in general, the appearance was poor.

In the examples, the composition used to spread the particles on the surface of the film is also the composition used to adhere the film to the glass underlayer. This dual function of the composition is not necessary for the successful operation of the invention. However, it is the most efficient mode of operation.

While an ethylene terephthalate-ethylene sebacate (60–40) copolymer was used as the adhesive composition in the examples, other adhesive compositions may be used. Among these are an adhesive based on a copolymer of butadiene and acrylonitrile which is cured with a phenolic thickening agent (manufactured by Minnesota Mining and Manufacturing Company), nitrocellulose lacquer adhesives and various polyester compositions known generally in the art as bonding agents for polyethylene terephthalate film. The only limitations on the adhesive compositions are that they will serve as satisfactory adherents for the particles; they will bond the film to the glass; and they are not sensitive to light (do not turn opaque or otherwise distort the passage of light waves).

The particles used may be of any material which does not chemically affect the carrier or the film. Suitable materials include sand, diatomaceous earths, titanium dioxide and starches such as corn, potato and rice starch. The critical limitation on the inert particles lies in specifying the largest dimension of these particles. The largest dimension of these particles may range from 2 to 25 microns. A particle size larger than 25 microns results in a film to glass lamination which has a hazy appearance. In the case of the film-covered television picture tube, the result is poor picture resolution. Particles smaller than 2 microns do not effectively prevent the appearance of the aforementioned light interference rings and air pockets in the film-covered glass object.

It is believed that the success of this invention depends on the particles being sufficiently large to prevent any contact between film and glass except along the areas of adherence, such as at the perimeter of the television picture tube. By the use of particles to prevent contact as above-described, it is possible to drape glass objects of any contour (concave, convex, sinusoidal, etc.) without encountering any optical interferences.

The present invention is particularly advantageous in providing a shatterproof envelope for television picture tubes which are evacuated to very low pressures, as a substitute for the more expensive, tempered glass enclosures currently used. When one or more layers of the film are formed over the face of the picture tube, there results a protective barrier between the tube and the television viewer when the enveloped tube is mounted in a television set. Should the tube be purposely or accidentally imploded, the film protects the viewer from flying glass fragments resulting from the explosion phase of the implosion-explosion reaction. Incandescent light bulbs, photo flash bulbs, fluorescent light tubes, may also be covered with organic termoplastic films as described with similar protective and optical advantages.

What is claimed is:

1. In the combination of a shaped transparent glass structure, a transparent organic thermoplastic polymeric film covering at least a portion of the surface of the glass structure and an adhesive composition therebetween, the improvement which comprises inert particles dispersed in the adhesive composition to prevent direct contact of said glass structure and said film, the largest dimension of each of said particles being from 2 to 25 microns whereby the transparency of the entire structure is substantially retained.

2. The structure as in claim 1 wherein the inert particles are selected from the group consisting of sand, starch, diatomaceous earth and titanium dioxide.

3. The structure as in claim 1 wherein the organic thermoplastic polymeric film is polyethylene terephthalate film.

4. The structure as in claim 1 wherein the organic thermoplastic polymeric film is oriented polyethylene terephthalate film.

5. The structure as in claim 1 wherein the organic thermoplastic polymeric film is biaxially oriented, heat-set polyethylene terephthalate film.

6. In the combination of a television picture tube, a transparent polyethylene terephthalate film protectively covering the viewing portion of said tube and a light insensitive adhesive polymeric composition therebetween, the improvement which comprises inert particles uniformly dispersed in the light insensitive polymeric composition to the extent of 2–5% by weight based on the weight of the polymer in said adhesive composition to prevent direct contact of said picture tube and said film over the viewing surface, said particles selected from the group consisting of sand, starch, diatomaceous earth and tianium dioxide, the largest dimension of each of said particles being from 2 to 25 microns whereby the transparency of the entire structure is substantially retained.

References Cited in the file of this patent

UNITED STATES PATENTS

| | | |
|---|---|---|
| 969,449 | Blake | Sept. 6, 1910 |
| 1,019,407 | Bakeland | Mar. 5, 1912 |
| 2,293,529 | Bedford | Aug. 18, 1942 |
| 2,310,002 | Van Geel et al. | Feb. 2, 1943 |
| 2,360,650 | Crane | Oct. 17, 1944 |
| 2,374,310 | Schaefer | Apr. 24, 1945 |
| 2,474,923 | Watkins | July 5, 1949 |
| 2,612,079 | Mahler | Sept. 30, 1952 |
| 2,697,058 | Lasak | Dec. 14, 1954 |
| 2,711,985 | Olson | June 28, 1955 |
| 2,737,597 | Strobino | Mar. 6, 1956 |
| 2,765,250 | Williams | Oct. 2, 1956 |
| 2,789,932 | Yaeger | Apr. 23, 1957 |
| 2,836,528 | Ford | May 27, 1958 |
| 2,867,241 | Fitz Harris | Jan. 6, 1959 |
| 2,909,443 | Wolinski | Oct. 20, 1959 |

FOREIGN PATENTS

| | | |
|---|---|---|
| 679,532 | Great Britain | Sept. 17, 1952 |
| 780,538 | Great Britain | Aug. 7, 1957 |
| 168,095 | Australia | Sept. 24, 1956 |